(12) United States Patent
Mitchell et al.

(10) Patent No.: US 11,371,631 B2
(45) Date of Patent: Jun. 28, 2022

(54) RESTRAINT GRIPPER COVER WITH LOCKOUT BREAKAWAY

(71) Applicant: Mueller International, LLC, Atlanta, GA (US)

(72) Inventors: Timothy J. Mitchell, Hixson, TN (US); Anton A. Nasledov, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 414 days.

(21) Appl. No.: 16/517,129

(22) Filed: Jul. 19, 2019

(65) Prior Publication Data

US 2021/0018125 A1 Jan. 21, 2021

(51) Int. Cl.
*F16L 21/04* (2006.01)
*F16L 25/06* (2006.01)
*F16L 21/08* (2006.01)

(52) U.S. Cl.
CPC .............. *F16L 25/06* (2013.01); *F16L 21/04* (2013.01); *F16L 21/08* (2013.01)

(58) Field of Classification Search
CPC . F16L 25/06; F16L 17/02; F16L 17/06; F16L 21/03; F16L 21/04; F16L 21/08; F16L 37/088; F16L 37/0887; F16L 37/0925; F16L 37/096; F16L 37/0982; F16L 37/121; F16L 37/122; F16L 37/1235; F16L 37/127; F16L 37/16; F16L 37/18
USPC .......... 285/337, 374, 399, 400, 39, 108, 104
See application file for complete search history.

(56) References Cited

U.S. PATENT DOCUMENTS

| 1,945,293 A | 1/1934 | Pierce |
| 1,964,044 A | 6/1934 | Engel |
| 2,355,407 A | 8/1944 | Wyss |
| 2,394,351 A | 2/1946 | Wurzburger |

(Continued)

FOREIGN PATENT DOCUMENTS

| CA | 2458710 | 8/2005 |
| CA | 2458788 | 8/2005 |

(Continued)

OTHER PUBLICATIONS

US 11,149,889 B2, 10/2021, Furcoiu (withdrawn)

(Continued)

*Primary Examiner* — Aaron M Dunwoody
(74) *Attorney, Agent, or Firm* — Taylor English Duma LLP

(57) ABSTRACT

A gland assembly for a piping element includes a gland comprising a joint restraint assembly comprising a restraint base, the restraint base defining a restraint pocket, the joint restraint assembly further comprising a gripper disposed within the restraint pocket, wherein the gripper is configured to rotate within the restraint pocket about and between a disengaged position in which the gripper is disengaged from the piping element and an engagement position in which the gripper is engaged with the piping element. The gland assembly also includes a cover removably attached to the restraint base, the cover comprising a bottom wall comprising a stop leg; a sidewall; a tab extending from the sidewall, the tab preventing the cover from being pushed onto the restraint base in a fully depressed configuration and preventing the stop leg from engaging the gripper into the disengaged position.

23 Claims, 10 Drawing Sheets

(56) References Cited

U.S. PATENT DOCUMENTS

| | | |
|---|---|---|
| 2,693,374 A | 11/1954 | Wurzburger |
| 2,887,328 A | 5/1959 | Risley et al. |
| 3,081,102 A | 3/1963 | Murray et al. |
| 3,150,876 A | 9/1964 | Lafferty |
| 3,162,469 A | 12/1964 | Shohan |
| 3,163,432 A | 12/1964 | De Boer |
| 3,179,446 A | 4/1965 | Paterson |
| 3,186,741 A | 6/1965 | Kurtz |
| 3,211,472 A | 10/1965 | Rickard |
| 3,249,371 A | 3/1966 | Peterman |
| 3,252,192 A | 5/1966 | Smith |
| 3,315,970 A | 4/1967 | Holoway |
| 3,315,971 A | 4/1967 | Sakurada |
| 3,414,273 A | 12/1968 | Sumner |
| 3,432,190 A | 3/1969 | Kunz |
| 3,485,515 A | 12/1969 | Frishof |
| 3,573,871 A | 4/1971 | Warner et al. |
| 3,642,306 A | 2/1972 | Gheen et al. |
| 3,653,695 A | 4/1972 | Dunton et al. |
| 3,680,874 A | 8/1972 | Schwarz |
| 3,684,317 A | 8/1972 | Kazienko et al. |
| 3,698,744 A | 10/1972 | Bevington |
| 3,877,733 A | 4/1975 | Straub |
| 3,980,097 A | 9/1976 | Ellis |
| 4,092,036 A | 5/1978 | Sato et al. |
| 4,380,348 A | 4/1983 | Swartz |
| 4,397,485 A | 8/1983 | Wood |
| 4,410,479 A | 10/1983 | Cyriax |
| 4,522,434 A | 6/1985 | Webb |
| 4,538,841 A | 9/1985 | Royston |
| 4,544,188 A | 10/1985 | Dugger |
| 4,568,112 A | 2/1986 | Bradley, Jr. et al. |
| 4,569,542 A | 2/1986 | Anderson et al. |
| 4,609,210 A | 9/1986 | Torokvei et al. |
| 4,629,176 A | 12/1986 | Ceelen |
| 4,664,426 A | 5/1987 | Ueki |
| 4,741,356 A | 5/1988 | Letzo et al. |
| 4,768,813 A | 9/1988 | Timmons |
| 4,779,900 A | 10/1988 | Shumard |
| 4,791,952 A | 12/1988 | Laurel |
| 4,848,808 A | 7/1989 | Pannell et al. |
| 4,858,968 A | 8/1989 | Moebius |
| 4,890,967 A | 1/1990 | Rosenbaum |
| 5,069,490 A | 12/1991 | Halen, Jr. |
| 5,071,175 A | 12/1991 | Kennedy, Jr. |
| 5,121,946 A | 6/1992 | Jardine |
| 5,205,568 A | 4/1993 | Stoll et al. |
| 5,232,252 A | 8/1993 | Bartholomew |
| 5,297,826 A | 3/1994 | Percebois et al. |
| 5,324,083 A | 6/1994 | Vogelsang |
| 5,335,946 A | 8/1994 | Dent et al. |
| 5,398,980 A | 3/1995 | Hunter |
| 5,437,481 A | 8/1995 | Spears et al. |
| 5,468,025 A | 11/1995 | Adinolfe et al. |
| 5,476,292 A | 12/1995 | Harper |
| 5,498,042 A | 3/1996 | Dole |
| 5,505,499 A | 4/1996 | Wallbank |
| 5,544,922 A | 8/1996 | Shumard et al. |
| 5,803,110 A | 9/1998 | Segal |
| 5,851,037 A | 12/1998 | Bridges |
| 5,941,576 A | 8/1999 | Krausz |
| 6,106,029 A | 8/2000 | Demore et al. |
| 6,173,993 B1 | 1/2001 | Shumard et al. |
| 6,273,469 B1 | 8/2001 | Kwaske et al. |
| 6,364,372 B1 | 4/2002 | Marandi |
| 6,457,718 B1 | 10/2002 | Quesada |
| 6,481,762 B1 | 11/2002 | Rex et al. |
| 6,830,268 B2 | 12/2004 | Krausz |
| 7,232,160 B2 | 6/2007 | Krausz |
| 7,243,955 B2 | 7/2007 | Krausz et al. |
| 7,469,939 B2 | 12/2008 | Westman et al. |
| 7,571,940 B2 | 8/2009 | Krausz |
| D602,127 S | 10/2009 | Shah et al. |
| 7,625,018 B2 | 12/2009 | Krausz |
| 7,654,586 B2 | 2/2010 | Krausz |
| 7,748,753 B2 | 7/2010 | Krausz |
| 7,837,238 B2 | 11/2010 | Krausz et al. |
| 7,883,126 B2 | 2/2011 | Terry et al. |
| 7,997,626 B2 | 8/2011 | Krausz |
| 7,997,628 B1 | 8/2011 | Smith, Jr. et al. |
| 8,042,816 B2 | 10/2011 | Krausz |
| 8,313,124 B2 | 11/2012 | Krausz |
| 8,408,606 B2 | 4/2013 | Krausz |
| 8,651,530 B2 | 2/2014 | Krausz |
| 8,857,861 B2 | 10/2014 | German |
| 8,870,189 B2 | 10/2014 | Krausz |
| 8,960,683 B2 | 2/2015 | Krausz |
| 8,960,729 B2 | 2/2015 | Chiproot |
| D724,185 S | 3/2015 | Chiproot |
| 9,086,177 B2 | 7/2015 | Artsiely |
| 9,109,701 B1 | 8/2015 | Copeland |
| 9,163,760 B2 | 10/2015 | Lundstrom et al. |
| 9,441,771 B2 | 9/2016 | German |
| 9,890,883 B2 | 2/2018 | Maenishi et al. |
| 10,018,290 B2 | 7/2018 | Kishi et al. |
| 10,107,428 B2 | 10/2018 | Kim |
| 10,677,381 B2 | 6/2020 | Furcoiu |
| 10,774,508 B2 | 9/2020 | Furcoiu et al. |
| 10,851,920 B2 | 12/2020 | Showkathali et al. |
| 10,941,887 B2 | 3/2021 | Furcoiu |
| 11,131,412 B2 | 9/2021 | Furcoiu |
| 11,162,621 B2 | 11/2021 | Furcoiu |
| 11,193,609 B2 | 12/2021 | Furcoiu |
| 11,199,280 B2 | 12/2021 | Furcoiu |
| 11,215,306 B2 | 1/2022 | Furcoiu |
| 11,306,463 B2 | 4/2022 | Furcoiu et al. |
| 11,313,504 B2 | 4/2022 | Furcoiu |
| 2002/0017789 A1 | 2/2002 | Holmes |
| 2002/0037194 A1 | 3/2002 | Gentile |
| 2003/0085566 A1 | 5/2003 | Rex et al. |
| 2004/0108713 A1 | 6/2004 | Krausz |
| 2004/0232698 A1 | 11/2004 | Jones |
| 2005/0194784 A1 | 9/2005 | Jones et al. |
| 2005/0253380 A1 | 11/2005 | Gibb et al. |
| 2006/0012172 A1 | 1/2006 | Kennedy |
| 2006/0087121 A1 | 4/2006 | Bradley |
| 2007/0108766 A1 | 5/2007 | Riordan et al. |
| 2007/0295406 A1 | 12/2007 | German et al. |
| 2009/0243289 A1 | 10/2009 | Madara et al. |
| 2010/0289256 A1 | 11/2010 | Shumard |
| 2011/0084484 A1 | 4/2011 | German et al. |
| 2011/0095519 A1 | 4/2011 | Krausz |
| 2011/0291409 A1 | 12/2011 | Kennedy, Jr. et al. |
| 2012/0025524 A1 | 2/2012 | Krausz |
| 2012/0119485 A1 | 5/2012 | Cichorek et al. |
| 2012/0299294 A1 | 11/2012 | Chiproot |
| 2012/0299295 A1 | 11/2012 | Chiproot |
| 2013/0056980 A1 | 3/2013 | Chiproot |
| 2013/0328305 A1 | 12/2013 | Chiproot |
| 2014/0001709 A1 | 1/2014 | Chiproot |
| 2014/0319781 A1 | 10/2014 | Chiproot |
| 2014/0319826 A1 | 10/2014 | Chiproot |
| 2015/0176728 A1 | 6/2015 | Bowman |
| 2015/0204468 A1 | 7/2015 | Jones |
| 2016/0341343 A1 | 11/2016 | Bowsher et al. |
| 2017/0030489 A1 | 2/2017 | Decesare et al. |
| 2017/0114933 A1 | 4/2017 | Copeland |
| 2017/0130431 A1 | 5/2017 | Pinney et al. |
| 2018/0306354 A1* | 10/2018 | Furcoiu .................. F16L 21/08 |
| 2018/0306361 A1 | 10/2018 | Furcoiu |
| 2018/0306362 A1 | 10/2018 | Furcoiu |
| 2019/0017636 A1 | 1/2019 | Furcoiu |
| 2019/0145565 A1 | 5/2019 | Furcoiu |
| 2019/0264843 A1 | 8/2019 | Furcoiu |
| 2019/0331265 A1 | 10/2019 | Bowman |
| 2020/0025321 A1 | 1/2020 | Furcoiu |
| 2020/0063900 A1 | 2/2020 | Furcoiu |
| 2020/0071915 A1 | 3/2020 | Furcoiu et al. |
| 2020/0248847 A1 | 8/2020 | Furcoiu |
| 2020/0248848 A1 | 8/2020 | Furcoiu |
| 2020/0263814 A1 | 8/2020 | Furcoiu |
| 2020/0354930 A1 | 11/2020 | Furcoiu et al. |
| 2021/0102647 A1 | 4/2021 | Furcoiu |

(56) References Cited

U.S. PATENT DOCUMENTS

| | | | |
|---|---|---|---|
| 2021/0324980 | A1 | 10/2021 | Furcoiu |
| 2021/0381632 | A1 | 12/2021 | Furcoiu |
| 2022/0018472 | A1 | 1/2022 | Furcoiu |

FOREIGN PATENT DOCUMENTS

| | | |
|---|---|---|
| CA | 2944828 | 11/2015 |
| CN | 1894531 | 1/2007 |
| CN | 202168185 | 3/2012 |
| DE | 19837803 | 3/2000 |
| DE | 202016100359 | 3/2016 |
| EP | 0273999 | 7/1988 |
| EP | 2463567 | 6/2012 |
| EP | 2494249 | 9/2012 |
| GB | 1311434 | 3/1973 |
| GR | 3030125 | 7/1999 |
| IL | 196511 | 1/2009 |
| IL | 196817 | 2/2009 |
| IL | 209936 | 12/2010 |
| KR | 100946658 | 3/2010 |
| KR | 101049449 | 7/2011 |
| KR | 20140062744 | 5/2014 |
| KR | 101418783 | 7/2014 |
| KR | 20160082923 | 7/2016 |
| WO | 2004048835 | 6/2004 |
| WO | 2011123865 | 10/2011 |
| WO | 2016108517 | 7/2016 |
| WO | 2018194787 | 10/2018 |
| WO | 2019212771 | 11/2019 |
| WO | 2020040995 | 2/2020 |
| WO | 2020050954 | 3/2020 |
| WO | 2020146073 | 7/2020 |
| WO | 2021015809 | 1/2021 |

OTHER PUBLICATIONS

US 11,268,641 B2, 03/2022, Furcoiu (withdrawn)
Furcoiu, Aurelian Ioan; Non-Final Office Action for U.S. Appl. No. 15/490,926, filed Apr. 19, 2017, dated Mar. 14, 2019, 30 pgs.
Furcoiu, Aurelian Ioan; Requirement for Restriction/Election for U.S. Appl. No. 15/490,926, filed Jan. 19, 2017, dated Jul. 1, 2019, 9 pgs.
Furcoiu, Aurelian Ioan; Requirement for Restriction/Election for U.S. Appl. No. 15/882,512, filed Jan. 29, 2018, dated Jul. 25, 2019, 8 pgs.
Furcoiu, Aurelian Ioan; International Search Report for PCT Application No. PCT/US18/23554, filed Mar. 21, 2018, dated Jun. 6, 2018, 10 pgs.
Furcoiu, Aurelian Ioan; International Search Report and Written Opinion for PCT Application No. PCT/US19/28339, filed Apr. 19, 2019, dated Jun. 26, 2019, 8 pgs.
Mueller International, LLC; Presentation which includes descriptions and images of known restraint devices. The restraint devices were publicly available prior to Apr. 19, 2017, 39 pgs.
Furcoiu, Aurelian Ioan; Notice of Allowance for U.S. Appl. No. 15/882,512, filed Jan. 29, 2018, dated May 24, 2021, 23 pgs.
Furcoiu, Aurelian Ioan; Final Office Action for U.S. Appl. No. 16/575,013, filed Sep. 18, 2019, dated Mar. 17, 2021, 15 pgs.
Furcoiu, Aurelian Ioan; Final Office Action for U.S. Appl. No. 16/242,059, filed Jan. 8, 2019, dated Mar. 11, 2021, 24 pgs.
Furcoiu, Aurelian Ioan; Final Office Action for U.S. Appl. No. 15/908,096, filed Feb. 28, 2018, dated May 26, 2021, 22 pgs.
Furcoiu, Aurelian Ioan; Supplemental Notice of Allowance for U.S. Appl. No. 15/966,796, filed Jan. 30, 2018, dated May 19, 2021, 6 pgs.
Furcoiu, Aurelian Ioan; Supplemental Notice of Allowance for U.S. Appl. No. 15/966,796, filed Jan. 30, 2018, dated Aug. 3, 2021, 7 pgs.
Furcoiu, Aurelian Ioan; Final Office Action for U.S. Appl. No. 16/109,204, filed Aug. 22, 2018, dated Mar. 14, 2021, 22 pgs.
Furcoiu, Aurelian Ioan; Notice of Allowance for U.S. Appl. No. 16/266,835, filed Feb. 4, 2019, dated Jul. 2, 2021, 11 pgs.
Furcoiu, Aurelian Ioan; International Preliminary Report on Patentability for PCT Application No. PCT/US19/65201, filed Dec. 9, 2019, dated Jul. 22, 2021, 9 pgs.
Furcoiu, Aurelian Ioan; Office Action for Chinese patent application No. 201880026432.6, file Mar. 21, 2018, dated May 28, 2021, 18 pgs.
Furcoiu, Aurelian Ioan; Non-Final Office Action for U.S. Appl. No. 16/242,059, filed Jan. 8, 2019, dated Nov. 20, 2020, 52 pgs.
Furcoiu, Aurelian Ioan; Corrected Notice of Allowance for U.S. Appl. No. 15/649,022, filed Jul. 13, 2017, dated Jan. 1, 2021, 8 pgs.
Furcoiu, Aurelian Ioan; Corrected Notice of Allowance for U.S. Appl. No. 15/649,022, filed Jul. 13, 2017, dated Nov. 12, 2020, 7 pgs.
Furcoiu, Aurelian Ioan; Corrected Notice of Allowance for U.S. Appl. No. 15/649,022, filed Jul. 13, 2017, dated Nov. 16, 2020, 9 pgs.
Furcoiu, Aurelian Ioan; Notice of Allowance for U.S. Appl. No. 15/649,022, filed Jul. 13, 2017, dated Dec. 9, 2020, 9 pgs.
Furcoiu, Aurelian Ioan; Non-Final Office Action for U.S. Appl. No. 15/908,096, filed Feb. 28, 2018, dated Dec. 15, 2020, 23 pgs.
Furcoiu, Aurelian Ioan; Non-Final Office Action for U.S. Appl. No. 16/109,204, filed Aug. 22, 2018, dated Dec. 22, 2020, 65 pgs.
Furcoiu, Aurelian Ioan; Requirement for Restriction/Election for U.S. Appl. No. 16/109,204, filed Aug. 22, 2018, dated Oct. 27, 2020, 6 pgs.
Furcoiu, Aurelian Ioan; Office Action for European patent application No. 18787054.8, filed Mar. 21, 2018, dated Dec. 22, 2020, 3 pgs.
Furcoiu, Aurelian Ioan; International Preliminary Report on Patentability for PCT Application No. PCT/US19/28339, filed Apr. 19, 2019, dated Nov. 12, 2020, 7 pgs.
Furcoiu, Aurelian Ioan; Notice of Allowance for U.S. Appl. No. 15/649,022, filed Jul. 13, 2017, dated Oct. 1, 2020, 16 pgs.
Furcoiu, Aurelian Ioan; Non-Final Office Action for U.S. Appl. No. 15/966,796, filed Apr. 30, 2018, dated Sep. 3, 2020, 19 pgs.
Furcoiu, Aurelian Ioan; Corrected Notice of Allowance for U.S. Appl. No. 16/121,132, filed Sep. 4, 2018, dated Aug. 12, 2020, 8 pgs.
Furcoiu, Aurelian Ioan; Final Office Action for U.S. Appl. No. 15/882,512, filed Jan. 29, 2018, dated Jan. 28, 2021, 20 pgs.
Furcoiu, Aurelian Ioan; Office Action for Chinese patent application No. 201880026432.6, file Mar. 21, 2018, dated Nov. 4, 2020, 13 pgs.
Furcoiu, Aurelian Ioan; Supplemental Notice of Allowance for U.S. Appl. No. 15/490,926, filed Apr. 19, 2017, dated Mar. 12, 2020, 9 pgs.
Furcoiu, Aurelian Ioan; Non-Final Office Action for U.S. Appl. No. 15/966,796, filed Apr. 20, 2018, dated Feb. 24, 2020, 40 pgs.
Furcoiu, Aurelian Ioan; Final Office Action for U.S. Appl. No. 16/121,132, filed Sep. 4, 2018, dated Apr. 20, 2020, 17 pgs.
Furcoiu, Aurelian Ioan; International Search Report and Written Opinion for PCT Application No. PCT/US19/65201, filed Dec. 9, 2019, dated Feb. 24, 2020, 10 pgs.
Furcoiu, Aurelian Ioan; Requirement for Restriction/Election for U.S. Appl. No. 15/966,796, filed Apr. 30, 2018, dated Sep. 27, 2019, 8 pgs.
Furcoiu, Aurelian Ioan; Non-Final Office Action for U.S. Appl. No. 16/121,132, filed Sep. 4, 2018, dated Nov. 12, 2019, 31 pgs.
Furcoiu, Aurelian Ioan; International Preliminary Report on Patentability for PCT Application No. PCT/US18/23554, filed Mar. 21, 2018, dated Oct. 31, 2019, 8 pgs.
Furcoiu, Aurelian Ioan; Invitation to Pay Additional Fees for PCT/US19/46085, filed Aug. 12, 2019, dated Oct. 9, 2019, 2 pgs.
Furcoiu, Aurelian Ioan; International Search Report and Written Opinion for PCT Application No. PCT/US 19/45453, filed Aug. 7, 2019, dated Oct. 28, 2019, 9 pgs.
Furcoiu, Aurelian Ioan; Supplemental Notice of Allowance for U.S. Appl. No. 15/490,926, filed Apr. 19, 2017, dated May 14, 2020, 7 pgs.
Furcoiu, Aurelian Ioan; Non-Final Office Action for U.S. Appl. No. 15/882,512, filed Jan. 29, 2018, dated Jun. 26, 2020, 20 pgs.
Furcoiu, Aurelian Ioan; Non-Final Office Action for U.S. Appl. No. 15/649,022, filed Jul. 13, 2017, dated Jun. 25, 2020, 55 pgs.

(56) References Cited

OTHER PUBLICATIONS

Furcoiu, Aurelian Ioan; Requirement for Restriction/Election for U.S. Appl. No. 15/649,022, filed Jul. 13, 2017, dated May 19, 2020, 6 pgs.
Furcoiu, Aurelian Ioan; Non-Final Office Action for U.S. Appl. No. 15/908,096, filed Feb. 28, 2018, dated Jun. 18, 2020, 54 pgs.
Furcoiu, Aurelian Ioan; Notice of Allowance for U.S. Appl. No. 16/121,132, filed Sep. 4, 2018, dated Jun. 12, 2020, 9 pgs.
Furcoiu, Aurelian Ioan; Notice of Allowance for U.S. Appl. No. 15/490,926, filed Apr. 19, 2017, dated Feb. 12, 2020, 15 pgs.
Furcoiu, Aurelian Ioan; Non-Final Office Action for U.S. Appl. No. 15/882,512, filed Jan. 29, 2018, dated Dec. 12, 2019, 42 pgs.
Furcoiu, Aurelian Ioan; International Search Report and Written Opinion for PCT Application No. PCT/US19/46085, filed Aug. 12, 2019, dated Dec. 11, 2019, 13 pgs.
Mitchell, Timothy J.; International Search Report and Written Opinion for PCT Application No. PCT/US19/65337, filed Dec. 10, 2019, dated Feb. 5, 2020, 9 pgs.
Furcoiu, Aurelian Ioan; Non-Final Office Action for U.S. Appl. No. 16/854,369, filed Apr. 21, 2020, dated Sep. 22, 2021, 51 pgs.
Furcoiu, Aurelian Ioan; Supplemental Notice of Allowance for U.S. Appl. No. 15/882,512, filed Jan. 29, 2018, dated Sep. 1, 2021, 11 pgs.
Furcoiu, Aurelian Ioan; Notice of Allowance for U.S. Appl. No. 16/242,059, filed Jan. 8, 2019, dated Aug. 13, 2021, 18 pgs.
Furcoiu, Aurelian Ioan; Supplemental Notice of Allowance for U.S. Appl. No. 16/242,059, filed Jan. 8, 2019, dated Sep. 1, 2021, 7 pgs.
Furcoiu, Aurelian Ioan; Notice of Allowance for U.S. Appl. No. 15/908,096, filed Feb. 28, 2018, dated Aug. 16, 2021, 12 pgs.
Furcoiu, Aurelian Ioan; Non-Final Office Action for U.S. Appl. No. 16/942,996, filed Jul. 30, 2020, dated Sep. 29, 2021, 44 pgs.
Furcoiu, Aurelian Ioan; Advisory Action for U.S. Appl. No. 16/109,204, filed Aug. 22, 2018, dated Aug. 19, 2021, 10 pgs.
Furcoiu, Aurelian Ioan; Non-Final Office Action for U.S. Appl. No. 16/109,204, filed Aug. 22, 2018, dated Sep. 23, 2021, 19 pgs.
Furcoiu, Aurelian Ioan; Supplemental Notice of Allowance for U.S. Appl. No. 16/266,835, filed Feb. 4, 2019, dated Oct. 6, 2021, 7 pgs.
Furcoiu, Aurelian Ioan; Supplemental Notice of Allowance for U.S. Appl. No. 16/266,835, filed Feb. 4, 2019, dated Aug. 17, 2021, 7 pgs.
Furcoiu, Aurelian Ioan; Extended European Search Report for patent application No. 18787054.8, filed Mar. 21, 2018, dated Mar. 17, 2021 (received by European counsel for Applicant on Aug. 20, 2021), 9 pgs.
Furcoiu, Aurelian Ioan; Non-Final Office Action for U.S. Appl. No. 16/575,013, filed Sep. 18, 2019, dated Mar. 10, 2021, 55 pgs.
Furcoiu, Aurelian Ioan; Corrected Notice of Allowance for U.S. Appl. No. 15/649,022, filed Jul. 13, 2017, dated Feb. 3, 2021, 7 pgs.
Furcoiu, Aurelian Ioan; Notice of Allowance for U.S. Appl. No. 15/966,796, filed Apr. 30, 2018, dated Mar. 26, 2021, 26 pgs.
Furcoiu, Aurelian Ioan; Non-Final Office Action for U.S. Appl. No. 16/266,835, filed Feb. 4, 2019, dated Mar. 24, 2021, 62 pgs.
Furcoiu, Aurelian Ioan; Requirement for Restriction/Election for U.S. Appl. No. 16/266,835, filed Feb. 4, 2019, dated Feb. 22, 2021, 6 pgs.
Furcoiu, Aurelian Ioan; International Preliminary Report on Patentability for PCT Application No. PCT/US19/46085, filed Aug. 12, 2019, dated Mar. 18, 2021, 10 pgs.
Furcoiu, Aurelian Ioan; International Preliminary Report on Patentability for PCT Application No. PCT/US19/45453, filed Aug. 7, 2019, dated Mar. 4, 2021, 8 pgs.
Furcoiu, Aurelian Ioan; Office Action for Chinese patent application No. 201880026432.6, file Mar. 21, 2018, dated Nov. 10, 2021, 18 pgs.
Furcoiu, Aurelian Ioan; Extended European Search Report for application No. 19796735.9, filed Apr. 19, 2019, dated Jan. 4, 2022, 10 pgs.
Furcoiu, Aurelian Ioan; Notice of Allowance for U.S. Appl. No. 16/575,013, filed Sep. 18, 2019, dated Nov. 9, 2021, 13 pgs.
Furcoiu, Aurelian Ioan; Corrected Notice of Allowance for U.S. Appl. No. 15/908,096, filed Feb. 28, 2018, dated Nov. 1, 2021, 8 pgs.
Furcoiu, Aurelian Ioan; Corrected Notice of Allowance for U.S. Appl. No. 15/908,096, filed Feb. 28, 2018, dated Nov. 10, 2021, 7 pgs.
Furcoiu, Aurelian Ioan; Supplemental Notice of Allowance for U.S. Appl. No. 15/966,796, filed Apr. 30, 2018, dated Nov. 10, 2021, 6 pgs.
Furcoiu, Aurelian Ioan; Notice of Allowance for U.S. Appl. No. 16/854,369, filed Apr. 21, 2020, dated Mar. 10, 2022, 14 pgs.
Furcoiu, Aurelian Ioan; Non-Final Office Action for U.S. Appl. No. 16/854,384, filed Apr. 21, 2020, dated Jan. 14, 2022, 59 pgs.
Furcoiu, Aurelian Ioan; Notice of Allowance for U.S. Appl. No. 16/942,996, filed Jul. 30, 2020, dated Feb. 23, 2022, 15 pgs.
Furcoiu, Aurelian Ioan; Final Office Action for U.S. Appl. No. 16/109,204, filed Aug. 22, 2018, dated Feb. 1, 2022, 27 pgs.
Mitchell, Timothy J.; International Preliminary Report on Patentability for PCT Application No. PCT/US19/65337, filed Dec. 10, 2019, dated Feb. 3, 2022, 8 pgs.

\* cited by examiner

RESTRAINT GRIPPER COVER WITH LOCKOUT BREAKAWAY

TECHNICAL FIELD

This disclosure relates to pipe connections. More specifically, this disclosure relates to a lockout breakaway for a mechanical joint pipe connection.

BACKGROUND

Typical mechanical joint pipe connections do not provide for a positive retention mechanism other than friction of the gasket acting on the plain end of the length. The lack of a positive retention mechanism can compromise the seal or lead to the plain end pulling out of the female socket when the connection is subjected to high tension force or effects such as water hammer. Some mechanical joint pipe connections can incorporate a joint restraint mechanism configured to mechanically engage the plain end of the pipe; however, existing joint restraint mechanisms can exert high stresses upon the plain end of the pipe length which can lead to deformation, creep, and cracking of the plain end of the pipe length during installation or operation. Deformation, creep, and cracking can lead to failure of the seal or failure of the pipe length itself which can result in leaks or environmental contamination.

Mechanical joint assemblies can use rotatable grippers to engage a pipe surface. During shipping, assembly, and disassembly, various modes of engagement for the grippers may be preferable. For example, an engagement position, a disengaged position, and an intermediate position may be defined. Specially formed covers may aid in preparing these gripper modes.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a gland assembly for a piping element, the gland assembly comprising: a gland comprising: an annular ring defining a fastener hole, the annular ring defining a radially inward and a radially outward directionality; and a joint restraint assembly comprising a restraint base, the restraint base attached to the annular ring and defining a restraint pocket, the joint restraint assembly further comprising a gripper disposed within the restraint pocket, wherein the gripper is configured to rotate within the restraint pocket about and between a disengaged position in which the gripper is disengaged from the piping element and an engagement position in which the gripper is engaged with the piping element; and a cover removably attached to the restraint base, the cover comprising: a bottom wall comprising a stop leg; a sidewall; a tab extending from the sidewall, the tab configured to prevent the cover from being pushed onto the restraint base in a fully depressed configuration and to prevent the stop leg from engaging the gripper into the disengaged position.

Also disclosed is a method for breaking a tab on a cover, the cover comprising a top wall, a bottom wall opposing the top wall and having a stop leg, a sidewall extending between the top wall and the bottom wall, and a tab extending from the sidewall and defining a notch, the method comprising: placing the tab in a slot on a gland for joining piping elements, the gland defining the slot and comprising an annular ring configured to receive one of the piping elements; and twisting the cover to break the tab at the notch.

Also disclosed is a method for maintaining a gripper in an intermediate position, the method comprising: placing a cover, the cover comprising a tab, over a restraint pocket of a gland for a piping element, the gland comprising an annular ring, and a joint restraint assembly comprising a restraint base, the restraint base attached to the annular ring and defining the restraint pocket, the joint restraint assembly further comprising the gripper disposed within the restraint pocket, wherein the gripper is configured to rotate within the restraint pocket about and between a disengaged position in which the gripper is disengaged from the piping element, an engagement position in which the gripper is engaged with the piping element, and the intermediate position between the disengaged position and the engagement position, the intermediate position of the gripper configured to engage the piping element, allowing the pipe element to be inserted into the gland but not removed; and pushing down the cover until the tab contacts the gland.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
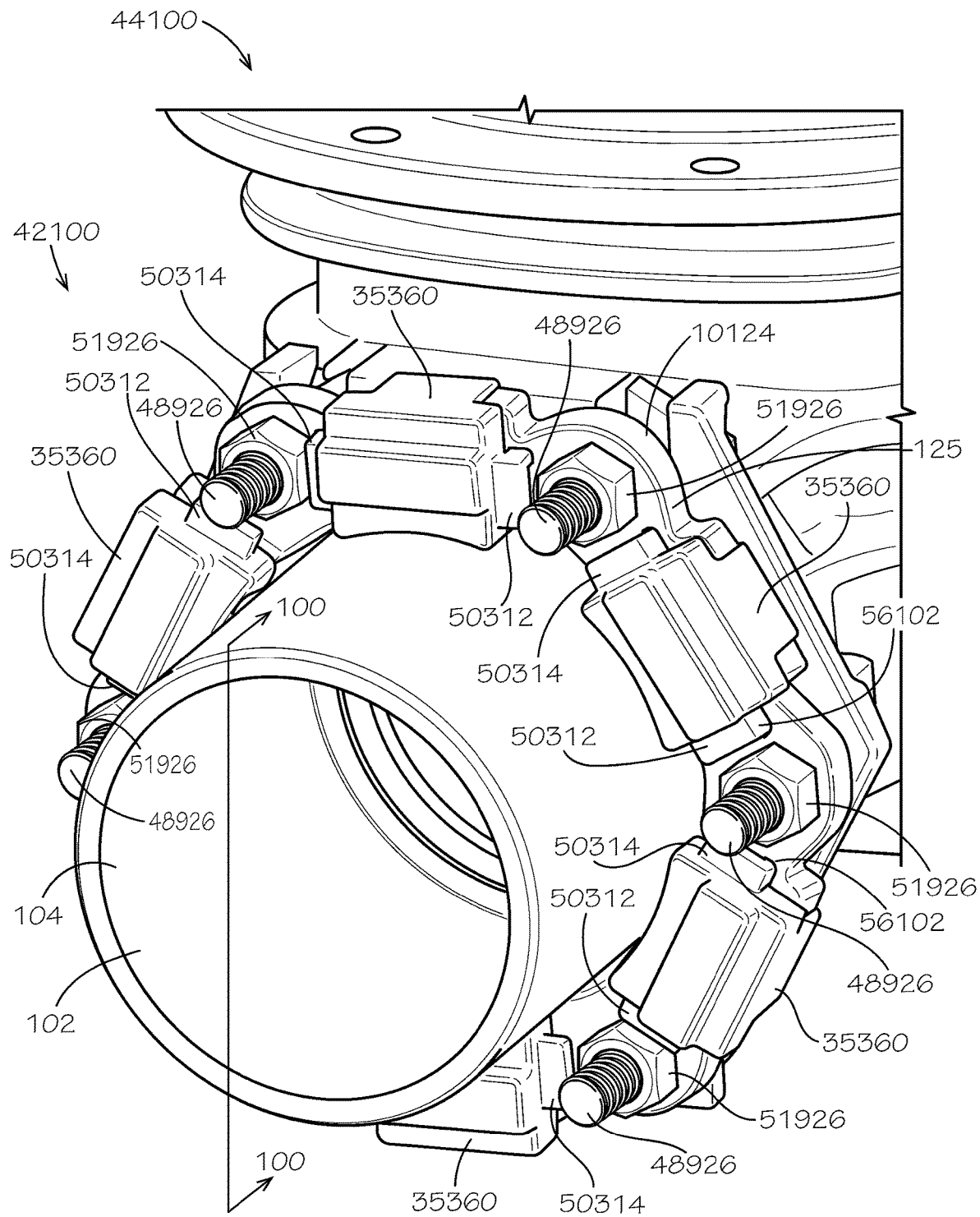
FIG. 1 is a perspective view of a mechanical joint assembly comprising covers with tabs mounted on a gland assembly, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

The use of the directional terms herein, such as right, left, front, back, top, bottom, and the like can refer to the orientation shown and described in the corresponding figures, but these directional terms should not be considered limiting on the orientation or configuration required by the present disclosure. The use of ordinal terms herein, such as first, second, third, fourth, and the like can refer to elements associated with elements having matching ordinal numbers. For example, a first light bulb can be associated with a first light socket, a second light bulb can be associated with a second light socket, and so on. However, the use of matching ordinal numbers should not be considered limiting on the associations required by the present disclosure.

The mechanical joint restraint disclosed herein can be similar to those described in the following applications: U.S. patent application Ser. No. 16/242,059, filed Jan. 8, 2019, entitled "Joint Restraint Device," which is a continuation-in-part of U.S. patent application Ser. No. 15/966,796, filed Apr. 30, 2018, entitled "Joint Restraint Device," which is a continuation-in-part of U.S. patent application Ser. No. 15/882,512, filed Jan. 29, 2018, entitled "Joint Restraint Device," which is a continuation-in-part of U.S. patent application Ser. No. 15/490,926, filed Apr. 19, 2017, entitled "Joint Restraint Device." These applications are hereby incorporated by reference in their entirety.

Disclosed is a cover for a gland assembly and associated methods, systems, devices, and various apparatus. It would be understood by one of skill in the art that the disclosed cover is described in but a few exemplary embodiments among many. No particular terminology or description should be considered limiting on the disclosure or the scope of any claims issuing therefrom. Terms used in the present disclosure can refer to identical terms in the incorporated references.

FIG. 1 is a perspective view of a mechanical joint assembly 44100 comprising covers 35360. For example and without limitation, the mechanical joint assembly 44100 can comprise the aspects disclosed in U.S. patent application Ser. No. 16/242,059. The mechanical joint assembly 44100 can be used to secure a pipe 104, such as a plain-end pipe, to a valve 44910, as shown in the present aspect. In other aspects, the mechanical joint assembly 44100 can secure any other piping element together, for example and without limitation, a coupling, pipe fitting, elbow fitting, a tee, or a wye. A gland 10124 can be an annular ring 125. With the covers 35360 mounted on the gland 10124, a pair of blocking ribs 50312,50314 can extend towards fasteners 48926 adjacent to each of the respective covers 35360. The blocking ribs 50312,50314 can be sized to provide clearance for a nut 51926 of each respective fastener 48926 to be rotated by hand; however, the blocking ribs 50312,50314 are also sized to prevent a tool from being positioned around the nuts 51926, such as a socket or the open or boxed ends of a hand wrench, for example and without limitation. The sizing of the blocking ribs 50312,50314 is configured to allow a user to hand-tighten the nuts 51926 with his or her fingers while the covers 35360 are mounted on the gland 10124 but also to prohibit the user from tightening the nuts 51926 with tools with the covers 35360 mounted on the gland 10124. Such an arrangement prevents the user from fully tightening an assembling the mechanical joint assembly 44100 without activating joint restraint assemblies 10134 (shown in FIG. 2) because the covers 35360 must be removed to facilitate final tightening of the nuts 51926, thereby activating the joint restraint assemblies 10134. The covers 35360 can comprise tabs 56102, the structure and function of which are described below. Line 100-100 defines a cross sectional plane running through a pipe length 102 and a top and a bottom cover 35360 (with respect to the orientation shown in FIG. 1).

Figure 2:
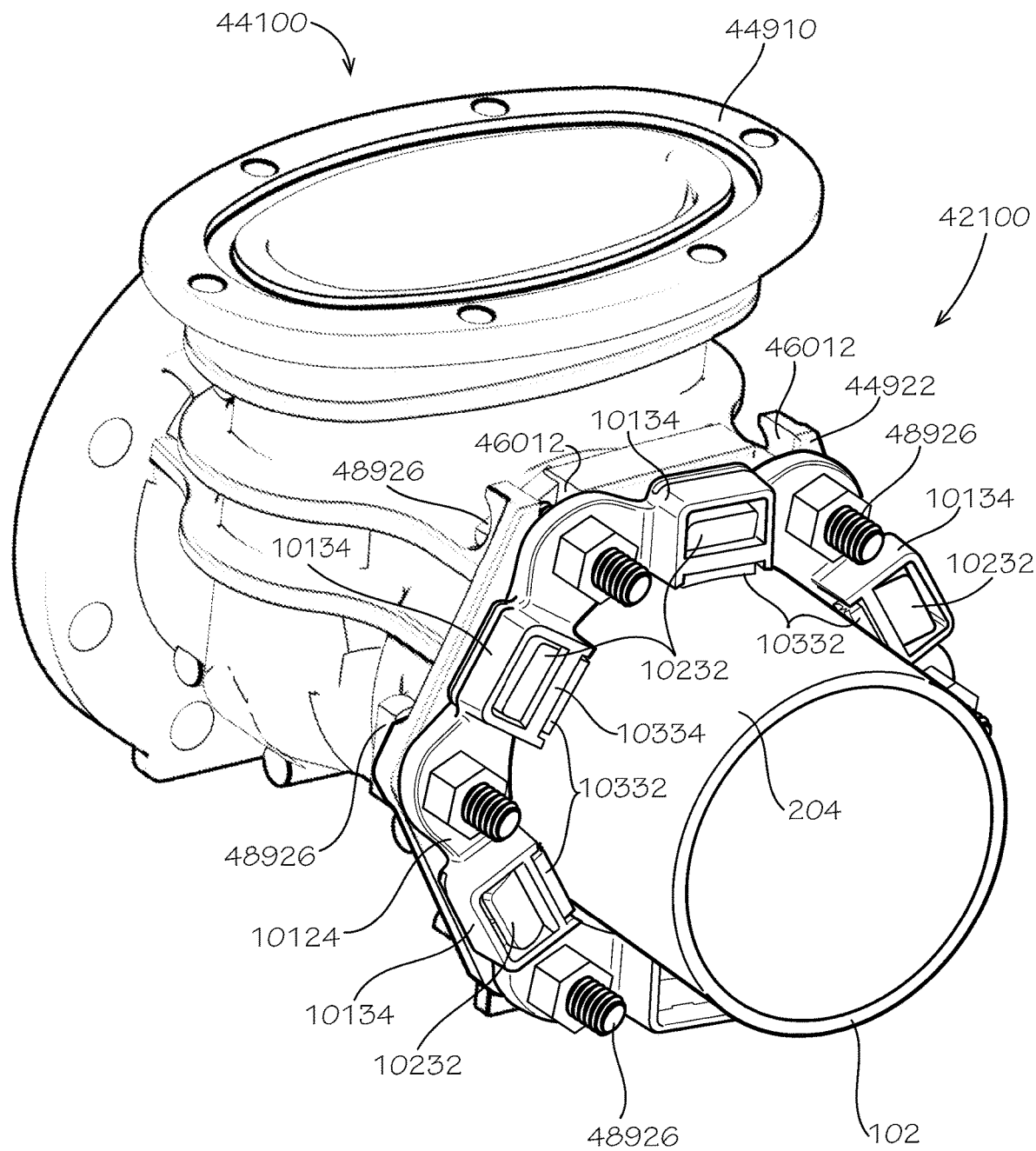
FIG. 2 is a perspective view of the mechanical joint assembly of FIG. 1 with the covers removed from the gland assembly.

FIG. 2 is a perspective view of the mechanical joint assembly 44100 of FIG. 1 with the covers 35360 (shown in FIG. 1) removed from a gland assembly 42100 and the gland 10124 fastened to a first flange 44922 of the valve 44910 by the fasteners 48926 in an assembled configuration. The first flange 44922 can define fastener notches 46012 or fastener holes (not shown). The fasteners 48926 can be inserted through fastener holes (not shown) of the gland 10124 and through either the fastener notches 46012 or fastener holes defined in the first flange 44922 to secure the gland assembly 42100 to the valve 44910.

Tightening of the fasteners 48926 can draw the gland assembly 42100 towards the first flange 44922, thereby rotating grippers 10232 of the joint restraint assemblies 10134 into the final engagement position, as shown. In the final engagement position, engagement ends 10332 of the respective grippers 10232 can be in full engagement with an outer pipe surface 204 of the pipe length 102.

Figure 3:
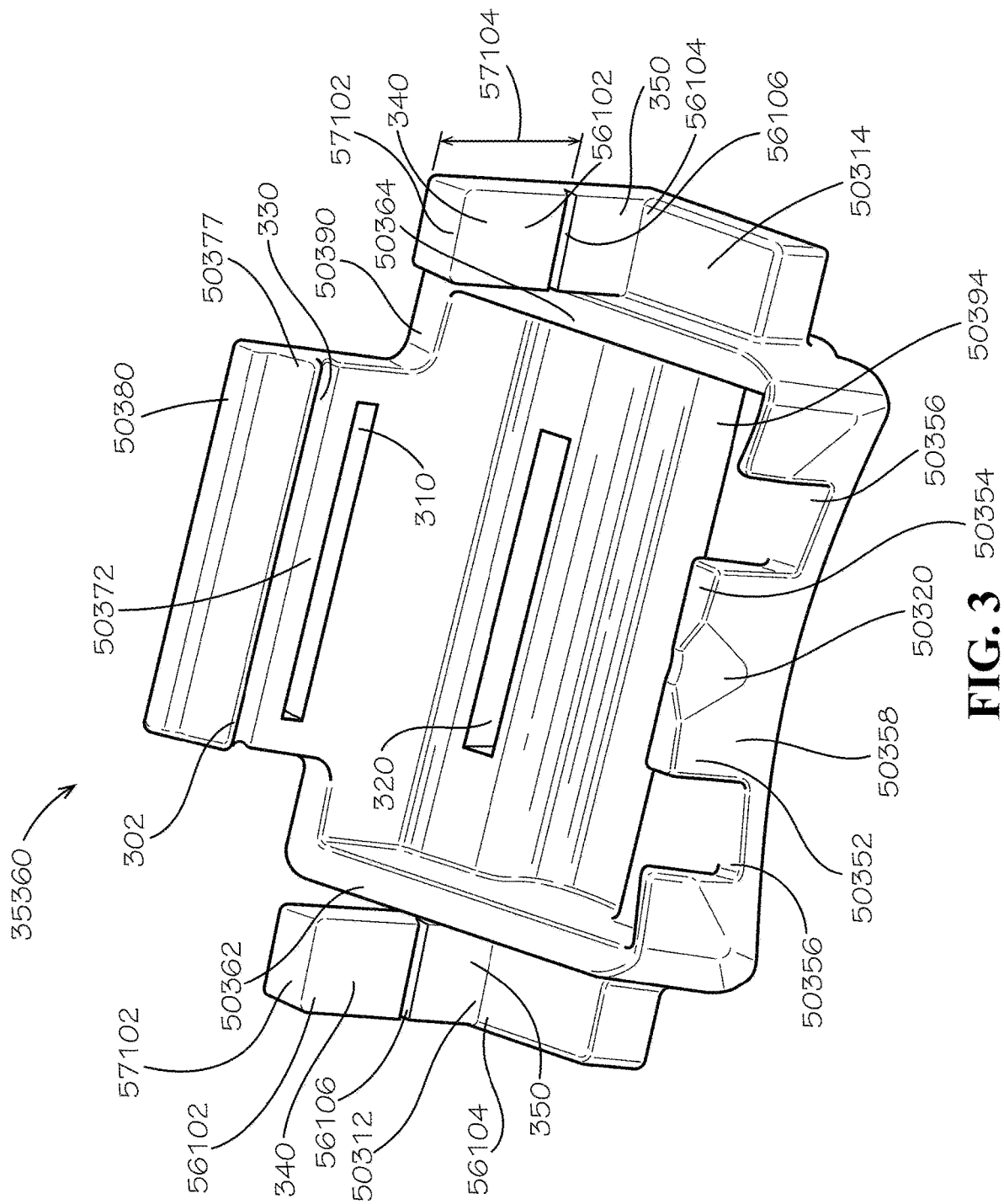
FIG. 3 is a rear perspective view of the cover with tabs of FIG. 1 in accordance with one aspect of the present disclosure.

FIG. 3 is a rear perspective view of the cover 35360 in accordance with one aspect of the present disclosure. The cover 35360 can define a pair of opposing sidewalls 50362, 50364, a top wall 50390, a bottom wall 50358, and a front wall 50394. The top wall 50390 and the bottom wall 50358 can each extend between the sidewalls 50362,50364. The front wall 50394 can extend between the sidewalls 50362, 50364 and from the top wall 50390 to the bottom wall 50358. In the present aspect, the sidewalls 50362,50364 can be substantially parallel to one another. In other aspects, the sidewalls 50362,50364 can be angled relative to one another.

Figure 5:
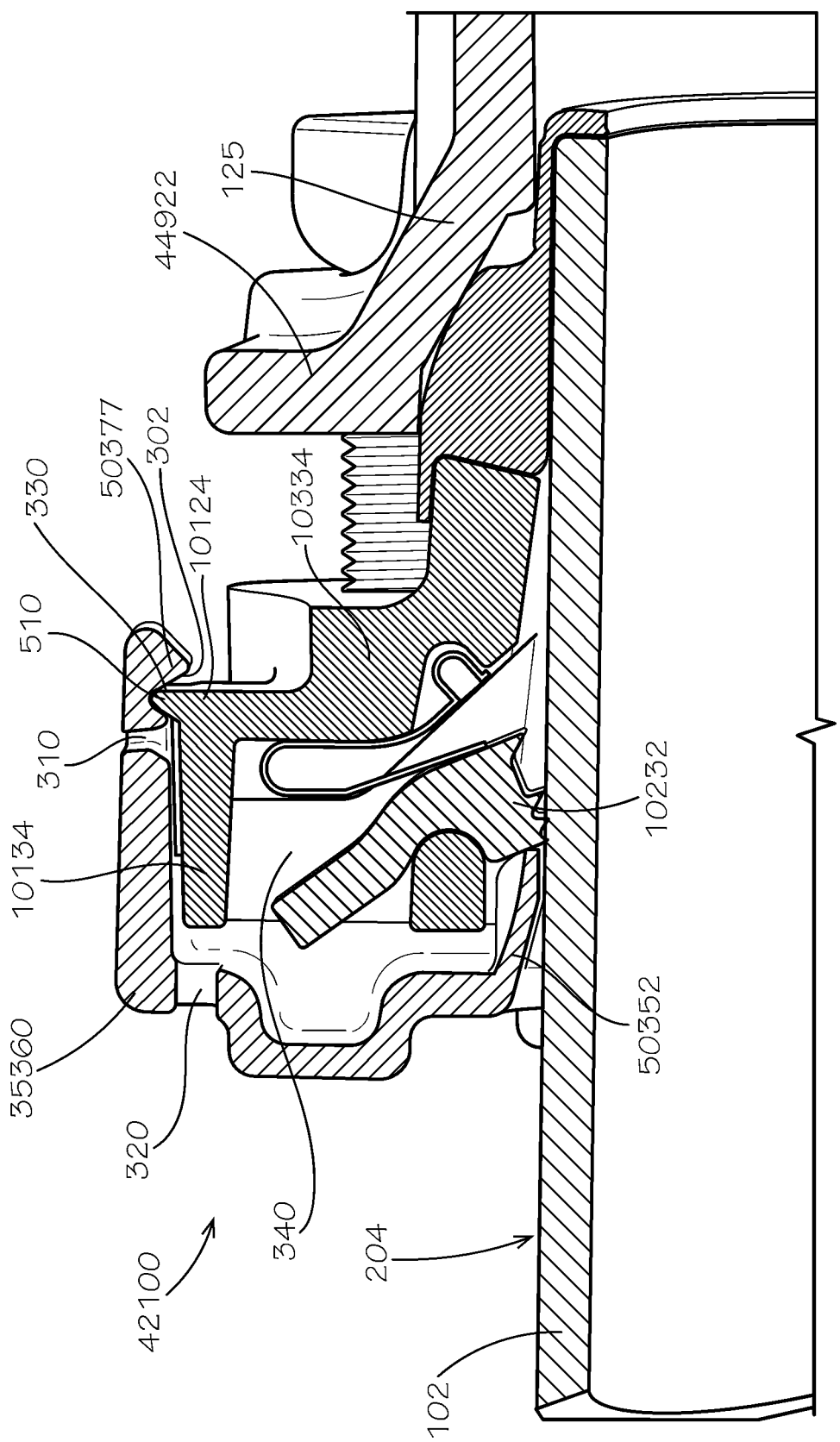
FIG. 5 is a cross-sectional side view of the gland assembly, taken along line 100-100 of FIG. 1, with a pipe end of a pipe length inserted into the gland assembly.

A cover engagement wall 50372 of the cover 35360 can extend rearward from the top wall 50390 and away from the front wall 50394. A tab stop 50377 can be disposed at or near an end 50380 of the cover engagement wall 50372. The cover engagement wall 50372 and the tab stop 50377 can be configured to secure the cover 35360 over a restraint base 10334, such as shown in FIG. 5, for example and without limitation.

In the present aspect, the bottom wall 50358 can define a curved shape configured to conform to the outer surface 204 of the pipe. The bottom wall 50358 can define a stop leg 50352, which can be configured to engage a gripper. In the present aspect, the bottom wall 50358 can define a pair of clearance slots 50356, and the stop leg 50352 can be positioned between the clearance slots 50356. The clearance slots 50356 can be configured to fit over sidewalls of the restraint base 10334, so that the cover 35360 can fit over the restraint base 10334.

The stop leg 50352 can define an end 50354 disposed opposite from the front wall 50394. The stop leg 50352 can define a relief notch 50320 extending frontwards from the end 50354 and toward the front wall 50394. The relief notch 50320 can be configured to provide clearance between the stop leg 50352 and a pipe length, such as the pipe length 102 (shown in FIG. 1).

The pair of blocking ribs 50312,50314 can extend outward from the respective sidewalls 50362,50364. In the present aspect, the blocking ribs 50312,50314 can be monolithically formed with the respective sidewalls 50362,50364; however, in other aspects, the blocking ribs 50312,50314 can be separate components, which can be permanently or detachably fixed to the respective sidewalls 50362,50364. In other aspects, the blocking ribs 50312,50314 may not be ribs, but instead could be a different style or shape of protuberance, such as a post, pyramid, or any other suitable type of protuberance.

Each tab 56102, which in the present aspect can be called a lockout breakaway, can extend from a one of the blocking ribs 50312,50314. Each tab 56102 can extend from a radially outer portion 56104 of the blocking ribs 50312,50314 when the cover 35360 is on the gland 10124. Each tab 56102 can comprise an end 57102, and a length 57104 can be defined between the end 57102 and a notch 56106 on the tab 56102. The end 57102 can be configured to contact the gland 10124 when the cover 35360 is in a partially depressed position, thereby preventing the cover 35360 from entering a fully depressed configuration. The notch 56106 can be defined on a radially inward side of the tab 56102, the notch 56106 configured to aid in breaking away the tab 56102 at a specified position. A portion of the tab 56102 between the end 57102 and the notch 56106 can be called a lockout portion 340. The tab 56102 can further comprise a connecting portion 350 between the lockout portion 340 and the sidewall 50362,50364. In the current aspect, the tab 56102 extends laterally outward from the sidewalls 50362,50364. In other aspects, such as the one shown in FIG. 4, the tab 56102 can also extend laterally inward from the sidewalls 50362,50364.

The cover engagement wall 50372 can comprise a groove 310 adjacent to the tab stop 50377, and the groove 310 can have a length that is parallel to the tab stop 50377. The cover 35360 can further define additional grooves 320. The cover engagement wall 50372 can define an indent 330 proximate the tab stop 50377.

Figure 4:
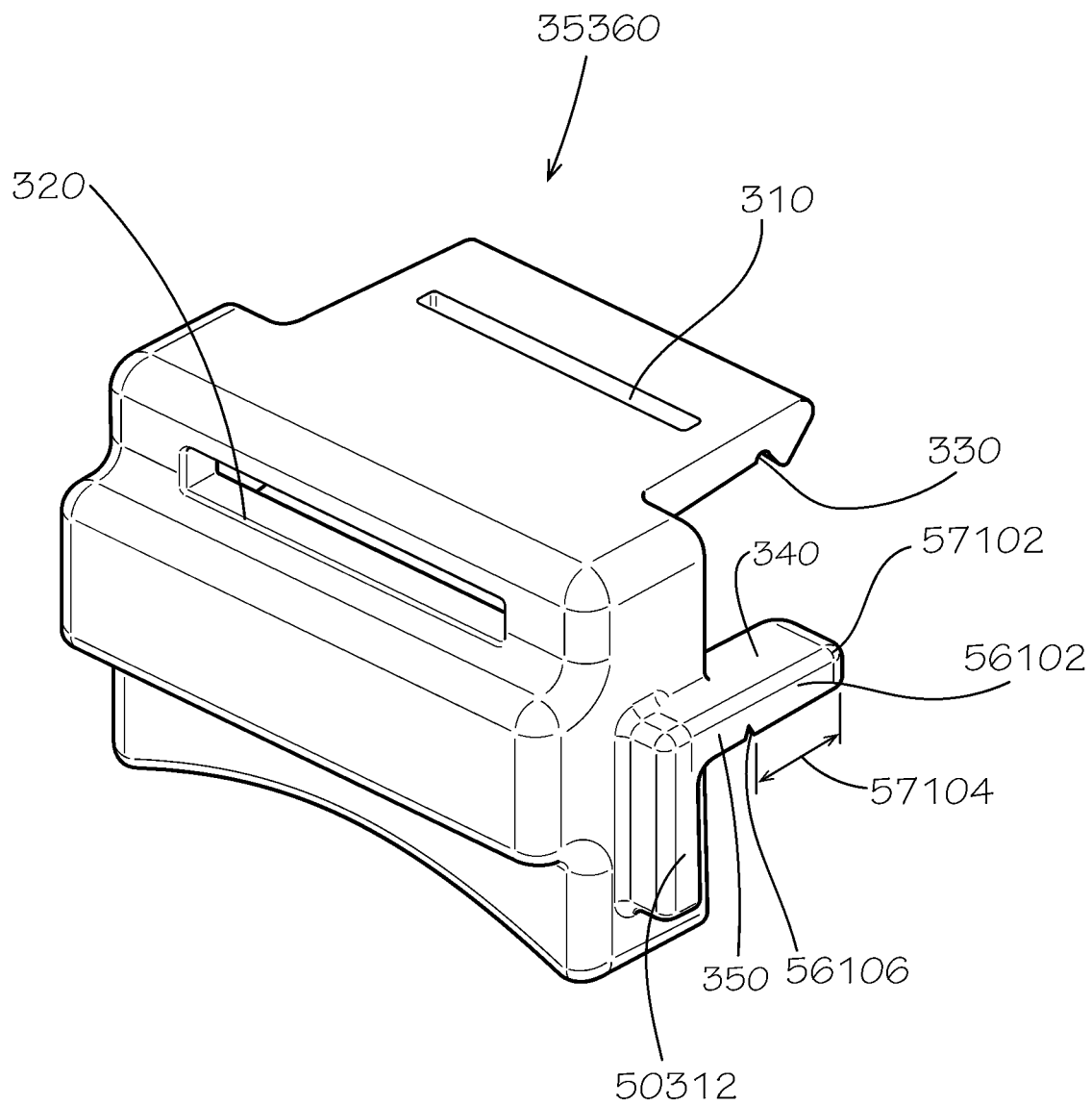
FIG. 4 is a front perspective view of the cover, in accordance with another aspect of the present disclosure.

FIG. 4 shows a perspective view of the cover 35360 in another aspect in accordance with present disclosure.

FIG. 5 shows a cross-section taken along the line 100-100 of FIG. 1. A tongue 510 can extend radially outward from the gland 10124 on a radially outward portion proximate to the flange 44922. The gland 10124 can further comprise joint restraint assemblies 10134 which can be equally spaced about a circumference of the annular ring 125 of the gland 10124. FIG. 5 demonstrates an intermediate mode or position of the cover 35360 and gripper 10232. The intermediate position can be one of three modes or positions of engagement, in accordance with one aspect of the current disclosure. A first mode can be an engaged mode (not shown), wherein the cover 35360 is removed and the grippers 10232 can engage the outer pipe surface 204 of the pipe length 102. A second mode can be the intermediate position, in which the cover 35360 is partially—but not fully—depressed, such that the stop legs 50352 can partially push the grippers 10232. As such, the grippers 10232 can partially engage the outer pipe surface 204, aiding the gradual insertion of the pipe and preventing the pipe from being easily removed. The covers 35360 can be shipped in the intermediate mode, in preparation for assembly. The cover 35360 can be secured in the intermediate position by positioning the cover 35360 such that the indent 330 of the cover 35360 receives the tongue 510 of the gland 10124. In another aspect, the groove 310 may not be present, and the tongue can be received by a sloped end 302 of the tab stop 50377.

The disengaged mode or position can be a configuration in which the stop legs 50352 of the cover 35360 secure the grippers 10232 in a disengaged position, wherein the gripper 10232 is out of contact with the outer pipe surface 204 and the pipe 104 can be removed or inserted without interference. The disengaged mode can comprise a fully depressed position of the cover 35360 with the cover 35360 pushed axially towards the gland 10124, wherein the tongue 510 on the gland 10124 engages the groove 310 on the cover engagement wall 50372. The disengaged mode can be useful for removing the pipe 104, such as for disassembly or reinsertion of the pipe 104 after an incorrect insertion. However, this mode may not be needed for initial assembly.

The restraint base 10334 can define a restraint pocket 340, and the gripper 10232 can be disposed within the restraint pocket 340, wherein the gripper 10232 is rotatable within the restraint pocket 340 about and between the disengaged position, the engagement position, and the intermediate position between the disengaged position and the engagement position. Having three possible modes of configuration may be confusing to installers, and the cover 35360 with the tab 56102 can facilitate assembly by keeping the covers 35360 and the grippers 10232 in the intermediate mode during shipping and assembly by keeping the cover 35360 from being pushed further towards the gland 10124. At the same time, having a notch 56106 (shown in FIG. 3 and FIG. 4) to ease breaking the tab 56102 can allow for relatively easy access to the disengaged mode.

Figure 6:
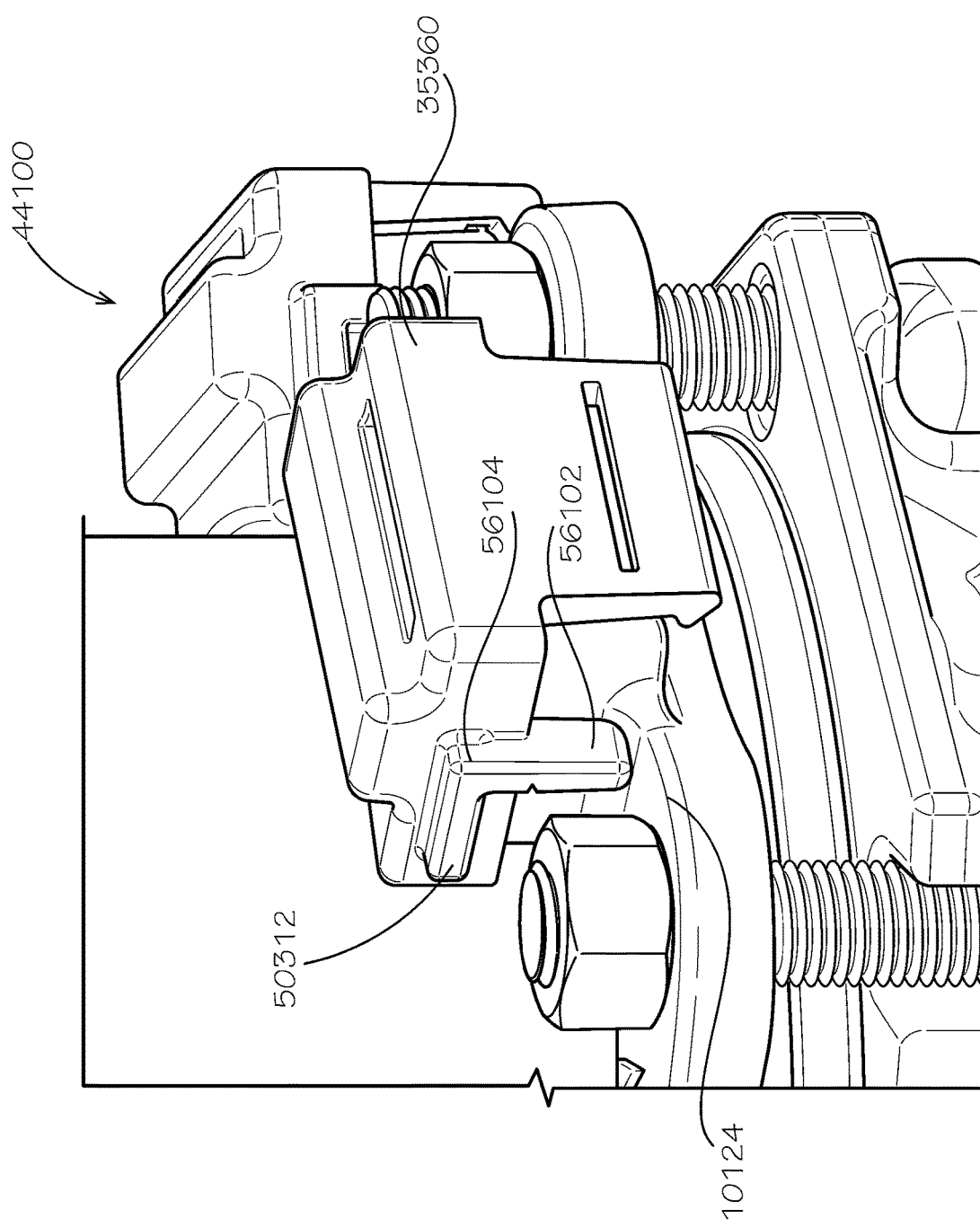
FIG. 6 is a close-up perspective view of the mechanical joint assembly of FIG. 1.

FIG. 6 is a perspective view of the mechanical joint assembly 44100 of FIG. 1, showing a close-up of the cover 35360 with the tab 56102. Positioning the tab 56102 at the radially outward portion 56104 of the blocking ribs 50312 can allow a slight but helpful tilt (or rotation) of the cover 35360 in a radially inward direction relative to the pipe length 102. This tilt can bias the grippers 10232 (shown in FIG. 5) to adjust their grip on the pipe 104 during assembly without disengaging the pipe length 102, allowing for finer adjustments. The tabs 56102 can be configured to maintain the cover 35360 in the intermediate position by pressing against the gland 10124, thus preventing or resisting the cover 35360 from being further depressed into a third, disengaged position (not shown).

Figure 7:
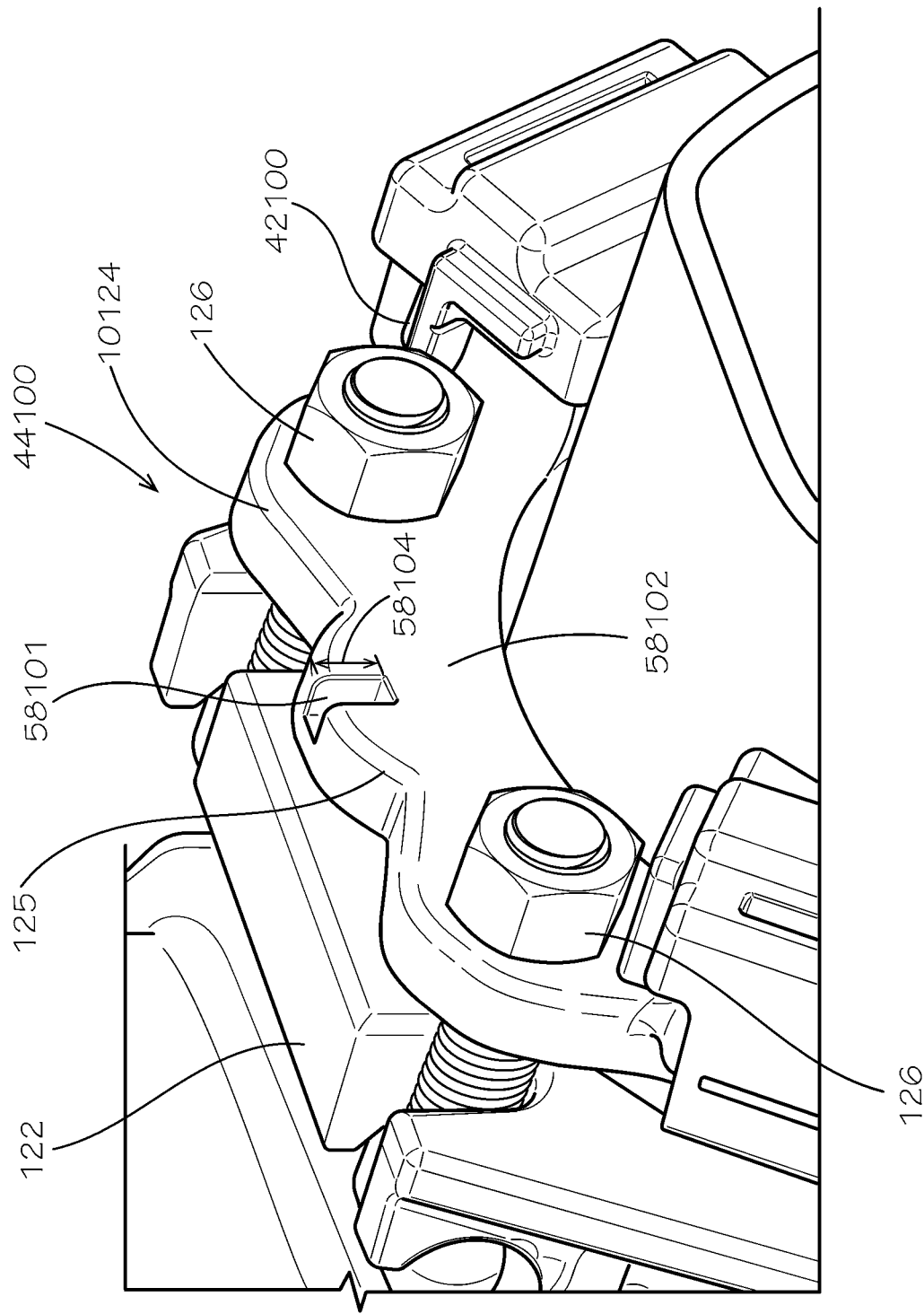
FIG. 7 is a perspective view of a mechanical joint assembly defining a slot configured to break the tab, in accordance with another aspect of the present disclosure.
Figure 8:
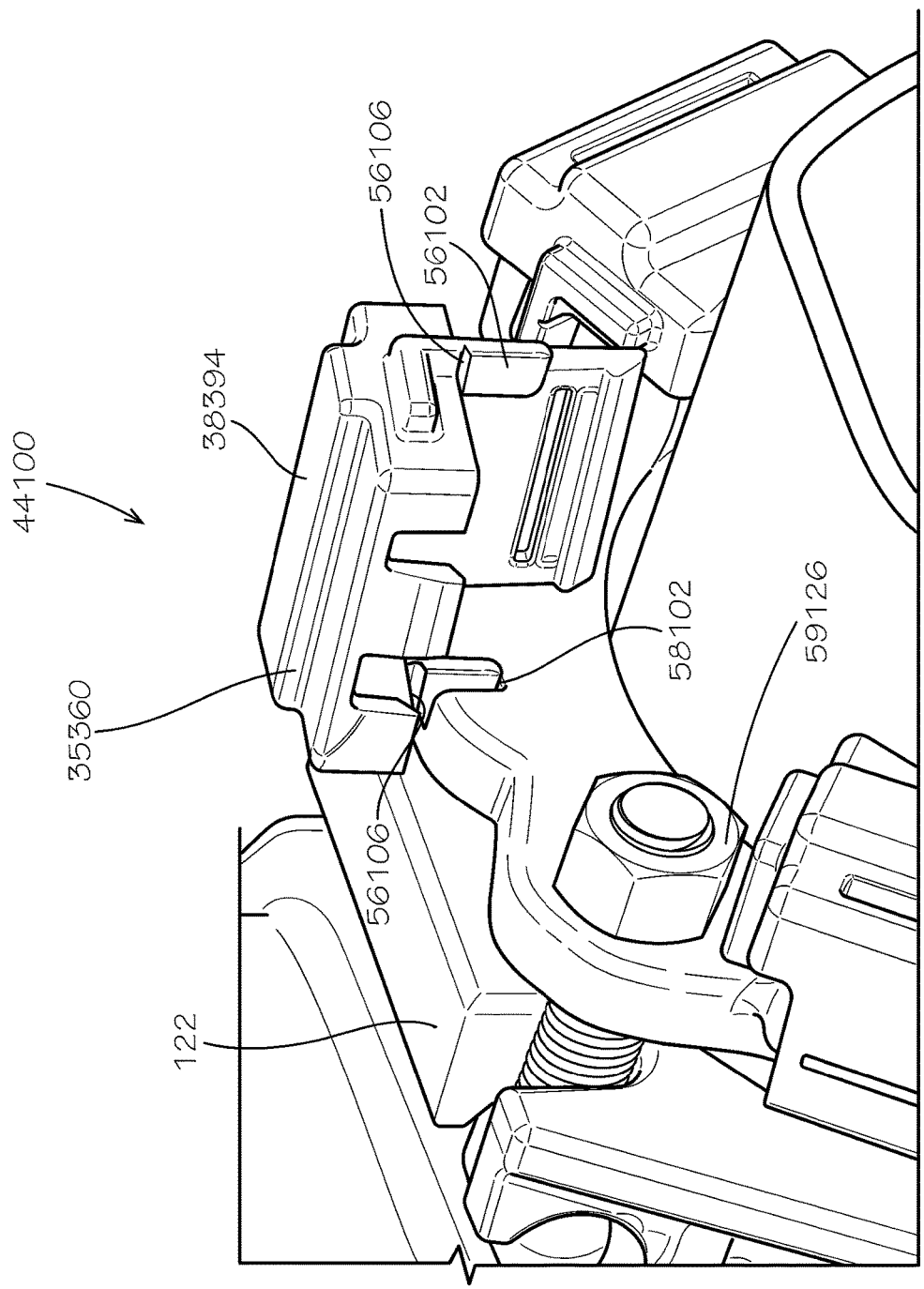
FIG. 8 is a perspective view of the mechanical joint assembly of FIG. 7, wherein the tab is inserted into the slot in preparation for being broken.

FIG. 7 is a perspective view of the mechanical joint assembly 44100, in accordance with another aspect of the current disclosure. The gland 10124 can comprise slots 58101 at regular intervals on the annular ring 125. As shown in FIG. 8, the slots 58101 can be configured to receive the tab 56102 of the cover 35360, such that twisting the cover 35360 in a direction away from the notch 56106 can break the tab 56102 at the notch 56106. The slot 58101 can have a depth 58104 similar to the length 57104 of the tab 56102. The slot 58101 can also extend partially through the annular ring 125 in a portion axially distal from an element flange 122. The annular ring 125 can comprise portions 58102 between fasteners 48926 that lack, or are devoid of, gland assemblies 42100. The slots 58101 can, without limitation, be defined on these such portions 58102.

In the orientation as shown in FIG. 8, the notch 56106 on the tab 56102 is facing left, and the cover 35360 can be twisted such that the front wall 38394 is pushed towards the right, thereby breaking the tab 56102 or releasing the breakaway.

Figure 9A:
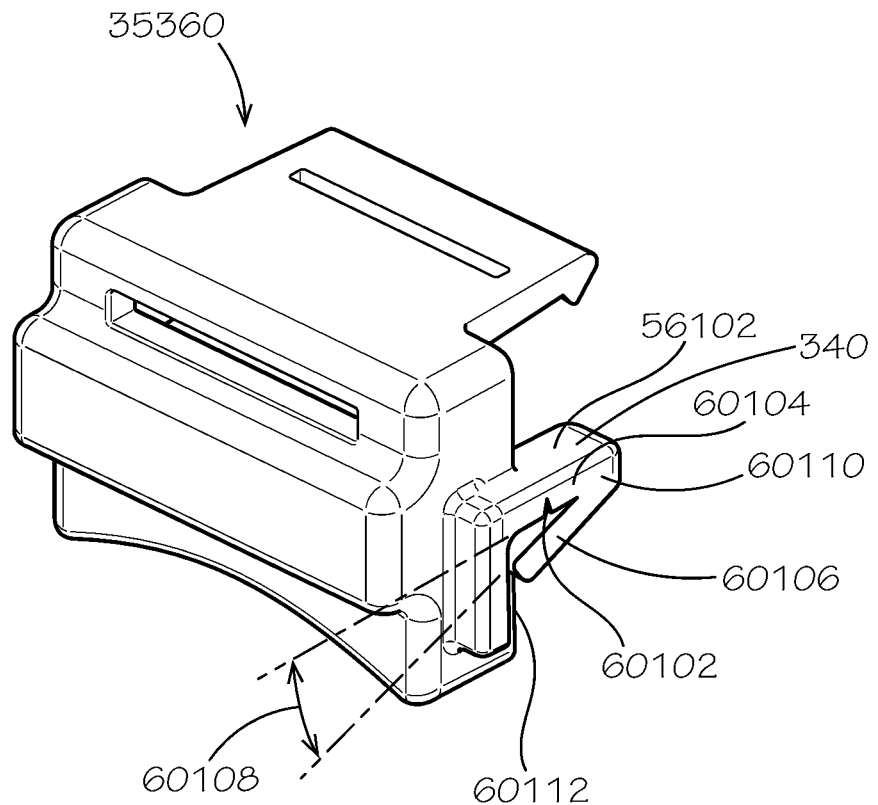
FIG. 9A is a front perspective view of the cover with a tab, in accordance with another aspect of the present disclosure.
Figure 10:
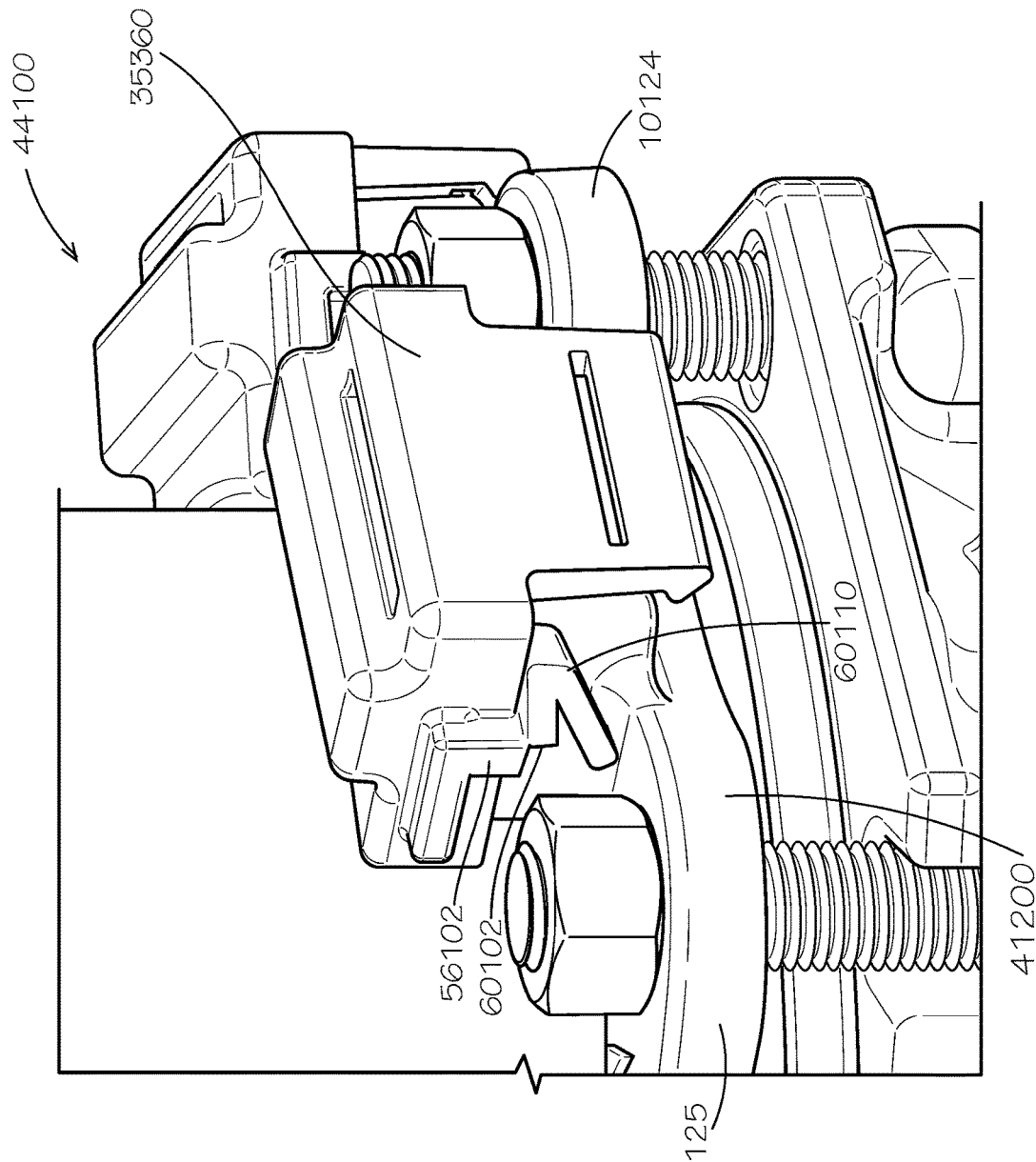
FIG. 10 is a perspective view of the mechanical joint assembly comprising the cover of FIG. 9A, wherein the tab is folded sideways in preparation for the cover to be pushed into a fully depressed position.

FIG. 9A is a perspective view of the cover 35360 with a tab 56102, in accordance with another aspect of the present disclosure. A hinge 60102 can join the tab 56102 to the cover 35360, such that the tab 56102 can alternatively be configured in a straight configuration or position, as in the current aspect, or in a sideways configuration or position, as shown in FIG. 10. When the cover 35360 is installed on the gland assembly 42100 (see FIG. 10), the hinge 60102 can be on a radially outward portion of the tab 56102. In some aspects, the hinge 60102 can be a living hinge, such that the hinge 60102 is formed monolithically with tab 56102 and/or the cover 35360.

In the present aspect, the tab 56102 can comprise a stop depress leg 60104 and a stabilizer leg 60106. The stop depress leg 60104 can join to the cover 35360 by the hinge 60102. The stop depress leg 60104 and the stabilizer leg 60106 can meet at a rigid angle 60108 in a stop depress end 60110. The angle 60108 can be an acute angle, such as approximately 45 degrees, 30 degrees, 20 degrees, or 15 degrees, such that the stabilizer leg 60106 does not interfere with placing the cover 35360 into the disengaged position when the tab 56102 is in the sideways position. The stabilizer leg 60106 can extend to meet or contact a rear side portion 60112 of the cover 35360. In the present aspect, the lockout portion 340 can be a portion of the tab 56102 extending away from the sidewalls 50362,50364 past the notch 56106.

Figure 9B:
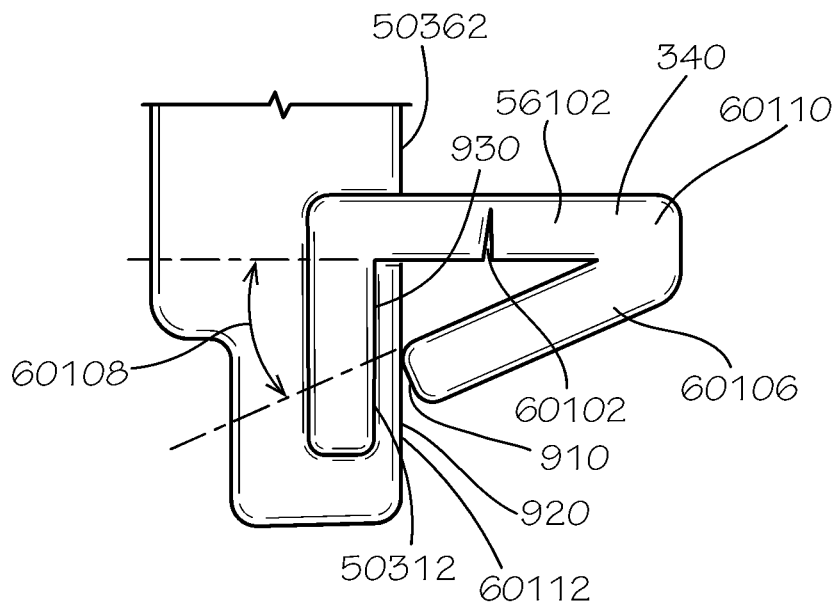
FIG. 9B is a side view of the cover of FIG. 9A.

FIG. 9B is a side view of the cover of FIG. 9A. In this view, a stabilizer end 910 of the stabilizer leg 60106 can be seen to contact a rear side 920 of the sidewall 50362 but not a rear side 930 of the rib 50312. In other aspects, particularly when the tab 56102 extends laterally outward but does not laterally overlap the sidewall 50362 (see FIG. 3), the stabilizer end 910 can contact the rib 50312.

FIG. 10 is a perspective view of the mechanical joint assembly 44100, comprising the cover 35360 of FIG. 9A. The covers 35360 can be installed on the gland 10124 during shipping and installation, the cover engagement wall 50372 gripping the tongue 510 of the gland 10124, and the tab 56102 held in the straight configuration by contact of the stop depress end 60110 of the tab 56102 with the gland 10124 (straight configuration shown in FIG. 9A and FIG. 9B). The straight configuration can correspond to keeping the cover 35360 and the grippers 10232 in the intermediate position, as shown in FIG. 5. When the tab 56102 is in the sideways position, as shown in the current aspect, the tab 56102 does not contact the annular ring 125, and the cover 35360 may be allowed to fully depress into the disengaged mode or position. Placing the tab 56102 in the sideways position from the straight position while the cover 35360 is in the intermediate position may first require removing the cover 35360 from the gland assembly 42100, sweeping the tab 56102 to the sideways position, and then replacing the cover 35360 on the gland assembly 42100.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A gland assembly for a piping element, the gland assembly comprising:
    a gland comprising:
        an annular ring defining a fastener hole, the annular ring defining a radially inward and a radially outward directionality; and
        a joint restraint assembly comprising a restraint base, the restraint base attached to the annular ring and defining a restraint pocket, the joint restraint assembly further comprising a gripper disposed within the restraint pocket, wherein the gripper is configured to rotate within the restraint pocket about and between a disengaged position in which the gripper is disengaged from the piping element and an engagement position in which the gripper is engaged with the piping element; and
    a cover removably attached to the restraint base, the cover comprising:
        a bottom wall comprising a stop leg;
        a sidewall;
        a tab extending from the sidewall, the tab configured to prevent the cover from being pushed onto the restraint base in a fully depressed configuration and to prevent the stop leg from engaging the gripper into the disengaged position, wherein:
            the tab comprises a lockout portion comprising an end, the end configured to contact the gland when the cover is in a partially depressed position, the end configured to prevent the cover from entering the fully depressed configuration; and
            wherein the lockout portion is breakable to remove the end from the tab and allow the cover to be fully depressed.

2. The gland assembly of claim 1, wherein the cover further comprises a cover engagement wall extending from a top wall of the cover, the cover engagement wall comprising a tab stop that extends radially inwardly toward the gland.

3. The gland assembly of claim 2, wherein:
    the gland further comprises a tongue extending radially outward; and
    the tab stop of the cover engages the tongue of the gland.

4. The gland assembly of claim 1, wherein the gripper can further define an intermediate position between the disengaged position and the engagement position, and wherein the gripper in the intermediate position is configured to engage the piping element with a traction that allows the pipe element to be inserted into the gland but not removed.

5. The gland assembly of claim 4, wherein the cover can be positioned such that the stop leg of the cover maintains the gripper in the intermediate position.

6. The gland assembly of claim 5, wherein:
    the cover further comprises a cover engagement wall extending from a top wall of the cover, the cover engagement wall comprising a tab stop that extends radially inwardly toward the gland;
    the gland further comprises a tongue extending radially outward; and
    the tab stop of the cover engages the tongue of the gland when the cover is positioned to maintain the gripper in the intermediate position.

7. The gland assembly of claim 5, wherein the tab comprises an end, the end configured to contact the gland when the cover is positioned to maintain the gripper in the intermediate position, the end configured to prevent the cover from pushing the gripper into the disengaged position.

8. The gland assembly of claim 5, wherein:
    the cover further comprises a cover engagement wall extending from a top wall of the cover, the cover engagement wall defining a groove;
    the gland further comprises a tongue extending radially outward; and
    the tongue is configured to engage the groove when the cover is depressed such that the stop leg maintains the gripper in the disengaged position.

9. The gland assembly of claim 1, wherein the tab further comprises:
    a connecting portion between the lockout portion and the sidewall; and
    a notch joining the lockout portion to the sidewall.

10. The gland assembly of claim 9, wherein the lockout portion is breakable at the notch.

11. The gland assembly of claim 10, wherein the gland further comprises slots configured to receive the lockout portion, the slots configured to help to break the lockout portion by providing an opposing torque as the cover is twisted.

12. The gland assembly of claim 9, wherein the lockout portion is configured to rotate at the notch, the lockout portion rotatable between a lockout position configured to prevent the cover from being fully depressed and a swept position configured to prevent contact of the gland with the end of the lockout portion.

13. The gland assembly of claim 12, wherein the lockout portion is rotatable by a living hinge at the notch.

14. The gland assembly of claim 12, wherein the lockout portion further comprises a stabilizer leg extending toward the sidewall, the stabilizer leg configured to stabilize the lockout portion to remain in the lockout position when the cover is pressed.

15. The gland assembly of claim 14, wherein the stabilizer leg stabilizes the lockout portion by directing a force from the gland through the stabilizer leg to the cover.

16. The gland assembly of claim 1, wherein:
the cover defines a top end and a bottom end;
the bottom wall is disposed at the bottom end;
the sidewall extends substantially between the top end and the bottom end; and
the tab is disposed between and spaced from each of the top end and the bottom end.

17. The gland assembly of claim 1, wherein the annular ring defines a front face facing in the radially outward direction, and wherein the end of the tab engages the front face of the annular ring in the partially depressed position.

18. A method for breaking a tab on a cover, the cover comprising a top wall, a bottom wall opposing the top wall and having a stop leg, a sidewall extending between the top wall and the bottom wall, and a tab extending from the sidewall and defining a notch, the method comprising:
placing the tab in a slot on a gland for joining piping elements, the gland defining the slot and comprising an annular ring configured to receive one of the piping elements; and
twisting the cover to break the tab at the notch.

19. The method of claim 18, wherein the gland further comprises a joint restraint assembly comprising a restraint base, the restraint base attached to the annular ring and defining a restraint pocket, the joint restraint assembly further comprising a gripper disposed within the restraint pocket, wherein the gripper is configured to rotate within the restraint pocket about and between a disengaged position in which the gripper is disengaged from the piping element and an engagement position in which the gripper is engaged with the piping element.

20. A method for maintaining a gripper in an intermediate position, the method comprising:
placing a cover, the cover comprising a tab, over a restraint pocket of a gland for a piping element, the gland comprising an annular ring, and a joint restraint assembly comprising a restraint base, the restraint base attached to the annular ring and defining the restraint pocket, the joint restraint assembly further comprising the gripper disposed within the restraint pocket, wherein the gripper is configured to rotate within the restraint pocket about and between a disengaged position in which the gripper is disengaged from the piping element, an engagement position in which the gripper is engaged with the piping element, and the intermediate position between the disengaged position and the engagement position, the intermediate position of the gripper configured to engage the piping element, allowing the pipe element to be inserted into the gland but not removed; and
pushing down the cover until the tab contacts the gland;
removing the tab from contact with the gland, which comprises breaking a lockout portion of the tab to remove an end of the lockout portion from the tab;
pushing the cover into a fully depressed configuration; and
engaging the gripper with the cover into the disengaged position.

21. The method of claim 20, further comprising engaging the gripper with a stop leg of the cover.

22. A gland assembly for a piping element, the gland assembly comprising:
a gland comprising:
an annular ring defining a fastener hole, the annular ring defining a radially inward and a radially outward directionality; and
a joint restraint assembly comprising a restraint base, the restraint base attached to the annular ring and defining a restraint pocket, the joint restraint assembly further comprising a gripper disposed within the restraint pocket, wherein the gripper is configured to rotate within the restraint pocket about and between a disengaged position in which the gripper is disengaged from the piping element and an engagement position in which the gripper is engaged with the piping element; and
a cover removably attached to the restraint base, the cover comprising:
a bottom wall comprising a stop leg;
a sidewall;
a tab extending from the sidewall, the tab configured to prevent the cover from being pushed onto the restraint base in a fully depressed configuration and to prevent the stop leg from engaging the gripper into the disengaged position;
wherein the gripper can further define an intermediate position between the disengaged position and the engagement position, and wherein the gripper in the intermediate position is configured to engage the piping element with a traction that allows the pipe element to be inserted into the gland but not removed;
wherein the cover can be positioned such that the stop leg of the cover maintains the gripper in the intermediate position; and
wherein:
the cover further comprises a cover engagement wall extending from a top wall of the cover, the cover engagement wall defining a groove;
the gland further comprises a tongue extending radially outward; and
the tongue is configured to engage the groove when the cover is depressed such that the stop leg maintains the gripper in the disengaged position.

23. A gland assembly for a piping element, the gland assembly comprising:
a gland comprising:
an annular ring defining a fastener hole, the annular ring defining a radially inward and a radially outward directionality; and
a joint restraint assembly comprising a restraint base, the restraint base attached to the annular ring and defining a restraint pocket, the joint restraint assembly further comprising a gripper disposed within the restraint pocket, wherein the gripper is configured to rotate within the restraint pocket about and between a disengaged position in which the gripper is disengaged from the piping element and an engagement position in which the gripper is engaged with the piping element; and a cover removably attached to the restraint base, the cover comprising:
  a bottom wall comprising a stop leg;
  a sidewall;
  a tab extending from the sidewall, the tab configured to prevent the cover from being pushed onto the restraint base in a fully depressed configuration and to prevent the stop leg from engaging the gripper into the disengaged position;

wherein the tab further comprises:
  a lockout portion comprising an end, the end configured to contact the gland when the cover is in a partially depressed position, the end configured to prevent the cover from entering the fully depressed configuration;
  a connecting portion between the lockout portion and the sidewall; and
  a notch joining the lockout portion to the sidewall.

* * * * *